Sept. 30, 1969 R. J. GILMAN ET AL 3,470,473
HIGH SPEED DATA TRANSMISSION SYSTEM WHICH MODULATES A HIGH FREQUENCY, FSK OSCILLATOR TO A LOWER TRANSMISSION FREQUENCY
Filed Oct. 29, 1965 3 Sheets-Sheet 1

ROBERT J. GILMAN and
GEORGE L. KING
INVENTORS

BY Rudolph J. Quick
ATTORNEY

Sept. 30, 1969 R. J. GILMAN ET AL 3,470,473

HIGH SPEED DATA TRANSMISSION SYSTEM WHICH MODULATES A HIGH FREQUENCY, FSK OSCILLATOR TO A LOWER TRANSMISSION FREQUENCY

Filed Oct. 29, 1965 3 Sheets-Sheet 2

ROBERT J. GILMAN and
GEORGE L. KING
INVENTORS

BY Rudolph J. Jurick
ATTORNEY

Sept. 30, 1969 R. J. GILMAN ET AL 3,470,473
HIGH SPEED DATA TRANSMISSION SYSTEM WHICH MODULATES A
HIGH FREQUENCY, FSK OSCILLATOR TO A LOWER
TRANSMISSION FREQUENCY
Filed Oct. 29, 1965 3 Sheets-Sheet 3

ROBERT J. GILMAN and
GEORGE L. KING
INVENTORS

BY Rudolph J. Quick
ATTORNEY 3,470,473

HIGH SPEED DATA TRANSMISSION SYSTEM WHICH MODULATES A HIGH FREQUENCY, FSK OSCILLATOR TO A LOWER TRANSMISSION FREQUENCY

Robert J. Gilman, Wayne, and George L. King, Morris Plains, N.J., assignors to RFL Industries, Inc., Boonton, N.J., a corporation of New Jersey Filed Oct. 29, 1965, Ser. No. 505,662
Int. Cl. H04b 7/12
U.S. Cl. 325—30 2 Claims

ABSTRACT OF THE DISCLOSURE

Frequency shift apparatus for transmission of high speed binary data over a voice band communication link. The frequency of a first high frequency oscillator, connected to a balanced modulator, is shifted in accordance with the data transmitted. The moduilator is driven by a second high frequency oscillator, the difference frequency between the two oscillators corresponding to a desired carrier frequency in the audio range. Both side bands of the modulated frequencies are amplified and passed through a filter tuned to the carrier frequency.

This invention relates to data transmission systems and more particularly to a frequency shift system for high speed transmission of binary coded data over conventional communication links.

A data transmission system made in accordance with this invention provides for the transmission of binary data at speeds up to 2,000 bits per seconst in the voice band and for the transmission of higher speeds over wide band facilities. The system utilizes frequency shift techniques and, therefore, is relatively immune to variations in signal level and high noise levels. Also, the system is of the non-synchronous class and can be used in either simplex, half-duplex, full-duplex and party line applications. The system is arranged to markedly reduce the fortuitous distortion or jitter normally encounter in frequency shift keying when the keying speed approaches the carrier frequency This is accomplished by frequency shift keying a high frequency oscillator and modulating its output to a lower frequency for transmission.

An object of this invention is the provision of a data transmission system of the frequency shift keying class, which system is operable in the audio band at keying speeds substantially higher than systems heretofore available.

An object of this invention is the provision of a frequency shift data transmission system for use with voice band communication links, which system can be operated at a keying speed approaching that of the carrier frequency and with a minimum of distortion.

An object of this invention is the provision of a high speed data transmission system for use with conventional communication links, which system operates by frequency shift keying a high frequency oscillator and modulating the oscillator output to a lower frequency for transmission.

An object of this invention is the provision of a high speed data transmitting and receiving apparatus of the frequency shift class wherein the transmitted signals comprise high frequency oscillations modulated at an audio frequency and wherein the received signals are demodulated and distinguished by a high frequency discriminator.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views.

In data transmission systems, signal pulses of two types are ordinarily utilized, and it is common practice to designate one pulse as a MARK signal and the other a SPACE signal. In frequency shift systems, the frequency of a carrier wave is shifted in one direction to provide a MARK signal and in the other direction to provide the SPACE signal. These signals are distinguished at the receiver to effect the actuation of suitable output devices. In a transmitting and receiving system intended for operation over voice band communication links, which is highly desirable, the characteristics of the link impose a limit on the carrier frequency. Thus, it has heretofore been the practice to use a carrier frequency in the audio range as, for example, 1700 cycles per second. This imposes a practical limitation on the keying frequency, that is, the speed at which the carrier frequency can be shifted to provide the MARK and SPACE signals. The bit rate of a MARK and SPACE pulse train is the time of the shortest pulse, or time that the shortest pulse is in one state. This time divided into one second yields the maximum bits per seconds which the system must handle. In general, for a maximum distortion of about 8%, the ratio of the carrier frequency to bit rate should be 10 or more. Thus, in the case of a system operating on a carrier frequency of 1700 cycles per second, the maximum keying speed of the system is of the order of 170 bits per second.

Figure 1:
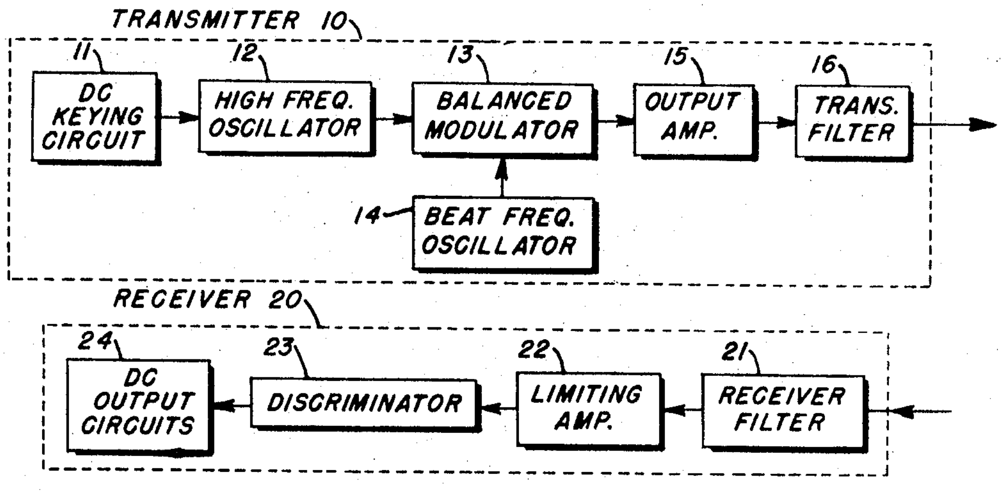
FIGURE 1 is a block diagram of a frequency shift data transmitter made in accordance with this invention and including a conventional frequency shift receiver.

In the system shown in the block diagram, of FIGURE 1, the transmitter 10 provides a channel for the transmission of data at speeds up to 2,000 bits per second over voice band communication links. This is accomplished by a keying circuit 11 which shifts the frequency of a high frequency oscillator 12 having a frequency, for example, of 30 kilocycles. The output of this oscillator is modulated by a balanced modulator 13 driven by a beat frequency oscillator 14 having a frequency, for example, of 28.3 kilocycles per second. As is standard in this art, the frequency of the oscillator 12 is changed by 600 cycles by operation of the keying circuit 11. Thus, the frequency of this oscillator is shifted to 30.6 kilocycles for a MARK signal and to 29.4 kilocycles for a SPACE signal. These output frequencies of the oscillator 12 are modulated by the 28.3 kilocycle beat frequency, whereby the output of the modulator 13 will be pulse trains having frequencies of 1,700±600 and 58,300±600 cycles per second, the higher frequency, in each case, corresponding to the transmission of a MARK signal and the lower frequency corresponding to a SPACE signal. These pulse trains are amplified by the output amplifier 15 and passed through the filter 16. This filter is tuned to pass frequencies of 1,700±600 cycles and has a band width of 2,000 cycles. Thus, the filter rejects the pulse trains having frequencies of 58,300±600 cycles and will pass the 1,700±600 cycle pulses at a keying rate of 2,000 bits. It will be apparent that the transmitted carrier has a center frequency of 1,700 cycles, which frequency is shifted to 2300 cycles for a MARK signal and to 1100 cycles for a SPACE signal. These frequencies are accommodated by voice band communication links with a minimum of distortion and loss.

FIGURE 1 also shows a conventional frequency shift receiver 20. The received MARK and SPACE signals are passed through the receiver filter 21 having the same characteristics as the transmitter filter 16. The MARK and SPACE signals, having frequencies of 2300 and 1100 cycles per second, are amplified by the limiting amplifier 22, and the amplified signals are applied to a conventional tuned discriminator providing discrete output voltages in correspondence with received MARK and SPACE signals. These voltages control the D.C. output circuits 24 to provide desired control functions or to actuate suitable read-out devices.

The receiver shown in FIGURE 1 is a conventional frequency shift receiver suitable for use in conjunction with the described transmitter where the receiver and its associated carrier filter is capable of yielding the data signal without excessive attenuation. In general, this combination is satisfactory for applications wherein the ratio between the carrier frequency and the bit rate is between 2.5 and 10.

Figure 2:
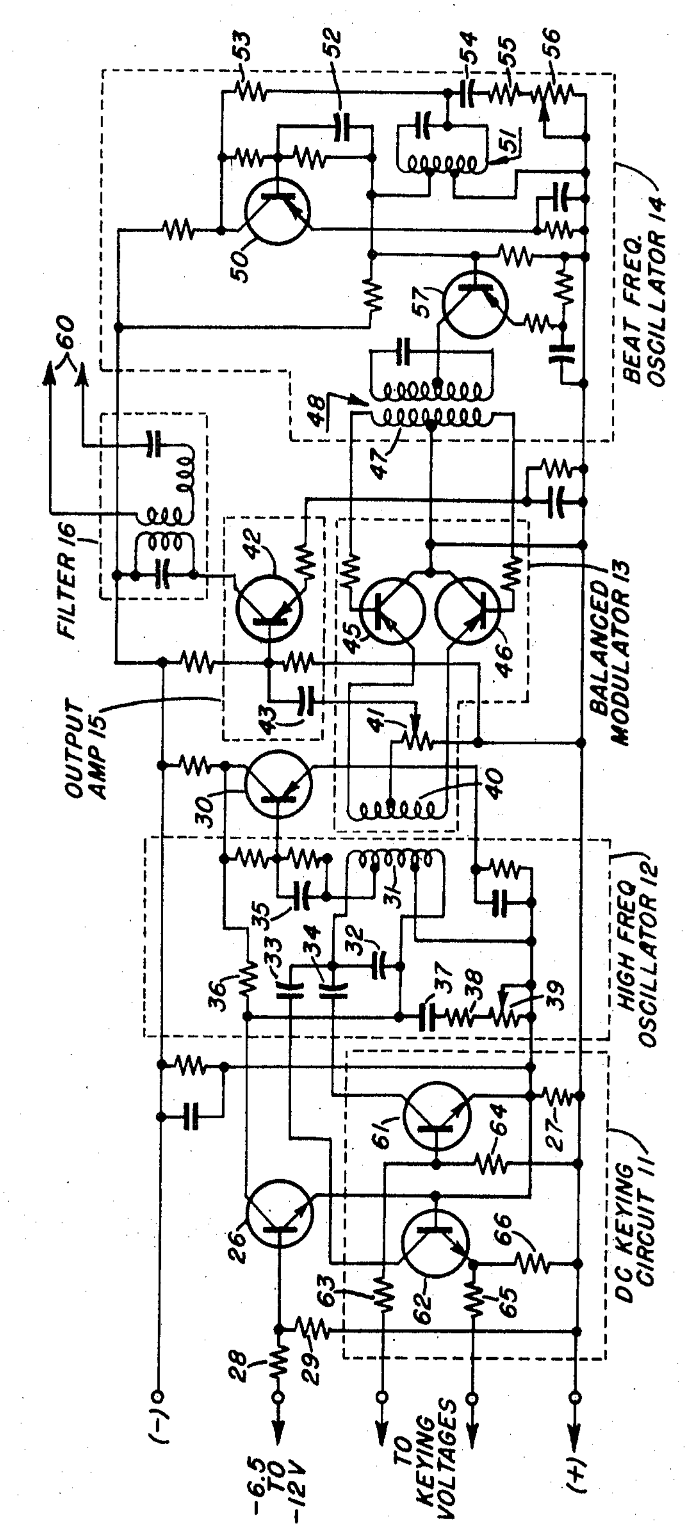
FIGURE 2 is a schematic circuit diagram of the transmitter shown in FIGURE 1.

Reference now is made to FIGURE 2, which is a schematic circuit diagram of the FIGURE 1 transmitter. The transistor 26 operates in the switching mode to turn the high frequency oscillator 12 on and off. The keying bias voltage level across the resistor 27 is a forward emitter bias on the transistor, resulting in a low collector-emitter impedance which shunts the collector feedback winding of the oscillator tuned circuit, thereby preventing oscillations. A negative voltage applied to the base of this transistor through the voltage divider resistors 28 and 29 will reverse bias the base-emitter and increase the collector-emitter impedance, thereby permitting the oscillator to oscillate.

The oscillator 12 is tuned to a high frequency (30 kilocycles) relative to the channel frequency of the carrier and comprises the transistor 30 and associated components. The tuned circuit consists of the inductance coil 31 and the capacitor 32, whereas the capacitors 33 and 34 are the frequency shift capacitors. Oscillations from the tuned circuit are coupled to the base of the transistor 30 by the capacitor 35 and feedback to the tuned circuit from the collector of this transistor is through the resistor 36. The network consisting of capacitor 37, resistor 38 and variable resistor 39 allows frequency adjustment by variation of the effective capacity of this capacitor across a portion of the tuned circuit. A second winding 40 coupled to the inductance coil 31 couples the output of the oscillator to a level control potentiometer 41. This winding provides D.C. isolation between the oscillator circuit and the output amplifier 15 comprising the transistor 42 operating as a Class A common-emitter stage with the base input signal coupled from the potentiometer 41 by the D.C. blocking capacitor 43.

The center-tapped winding 40 serves as a portion of the balanced modulator 13, which modulator includes the switching transistors 45 and 46. The bases of these transistors are driven by a beat frequency voltage obtained from a center-tapped secondary winding 47 of a tuned transformer 48 in the output circuit of the beat frequency oscillator 14.

The beat frequency oscillator 14 comprises the transistor 50 and the tuned tank circuit 51 and oscillates at a frequency of 28.3 kilocycles per second. Oscillations from the tuned circuit are coupled to the base of the transistor 50 by the capacitor 52. Feedback from the collector of this transistor to the tuned circuit is through the resistor 53. An RC network consisting of the capacitor 54 and resistors 55, 56 is connected across a portion of the tuned circuit for frequency trimming purposes, the resistor 56 being variable and controlling the effective capacity of the capacitor 54. The voltage from the tank circuit is also coupled to the base of the transistor 57 which operates as a Class A amplifier. The tuned transformer 48 is in the collector circuit of the transistor 57 and the center-tapped output winding 47 provides the switching voltages to the bases of the modulator transistors 45, 46.

It will be apparent that the output of the high frequency oscillator 12 is applied to the balanced modulator which is driven by a lower frequency oscillator to produce different frequencies equal to that of the channel. Both sum and difference frequencies are produced. In this case, the difference frequency is equal to that of the desired voice frequency carrier channel. Both side bands thus generated appear across to the level control potentiometer 41 and are applied to the base of the output amplifier transistor 42 having the band-pass filter 16 in its output circuit. This filter rejects the upper sideband and passes the lower sideband to the line 60. A shift in the high frequency oscillator 12, when keyed, will produce the same amount of shift in the frequency of the carrier. The transition of the derived carrier between two frequency states when it is shifted by this method at a given pulse rate is less random and fortuitous in nature than the transition when the keyed oscillator is tuned to the relatively low carrier frequency and no modulation is employed.

In a three-frequency keying system, the oscillator 12 is tuned to a MARK frequency by the capacitor 32. The addition of the capacitor 34 across the coil 31 will lower the frequency to Center and the parallel connection of capacitors 33 and 34 across the coil will lower the frequency still further to a SPACE frequency. In the absence of input keying voltages, the transistor 61 is clamped by the bias voltage of the resistor 27 at the emitter, thereby effectively connecting the capacitor 34 across the tuned circuit. On the other hand, the transistor 62 is reverse biased by the voltage of resistor 27 at the base, thereby effectively disconnecting the capacitor 33 from the tuned circuit. Under these conditions, the carrier output will be at the Center frequency. A MARK frequency is derived by applying a negative reverse bias voltage to the base of the transistor 61 through the voltage divider resistors 63 and 64, thereby increasing the collector-emitter impedance and resulting in the removal of the capacitor 34 from the tuned circuit. A SPACE frequency is generated when a negative forward bias voltage is applied to the emitter of the transistor 62, through the voltage divider resistors 65, 66. This causes the collector-base electrodes to clamp the capacitor 33 across the tuned circuit. The capacitor 34 is also connected in parallel with the capacitor 33 by the clamping action of the transistor 61 with forward emitter bias from the voltage across the resistor 27. It is pointed out that keying from the CENTER frequency to the MARK frequency and from the CENTER frequency to the SPACE frequency requires alternate application of the keying voltage to either the transistor 61 or the transistor 62. Simultaneous keying of both transistors will generate a frequency which tends to approach the CENTER frequency.

In a normal two keying system, the transistor 62 is removed from the circuit and the capacitors 33 and 34 permanently connected in parallel and clamped by the transistor 61, forward biased at the emitter, across the winding 31, thereby to generate a SPACE frequency. A negative voltage applied to the base of this transistor, through the divider resistors 63 and 64, will increase the collector-emitter impedance to effectively remove the capacitors 33 and 34 from the winding 31. This will leave only the capacitor 32 across the winding, thereby shifting the carrier frequency to provide a MARK signal.

The described transmitter, operating on the modulation principle, may be used with a conventional frequency shift receiver depending upon the transmission characteristics of the particular communication link, the ratio of the carrier to bit rate, and the percentage of distortion which can be tolerated. This particular transmitter-receiver combination is particularly adapted for applications over voice band channels when the ratio of the carrier to bit rate is 2.5 to 10. In this particular system, the receiver discriminator 23 is designed to distinguish between frequencies of 2300 and 1100 cycles corresponding, respectively, to the received MARK and SPACE signals, and the bit rate is low enough so that the 1700 cycle carrier can be filtered sufficiently from the recovered sigals without excessive attenuation of deterioration of the transmitted data.

Figure 3:
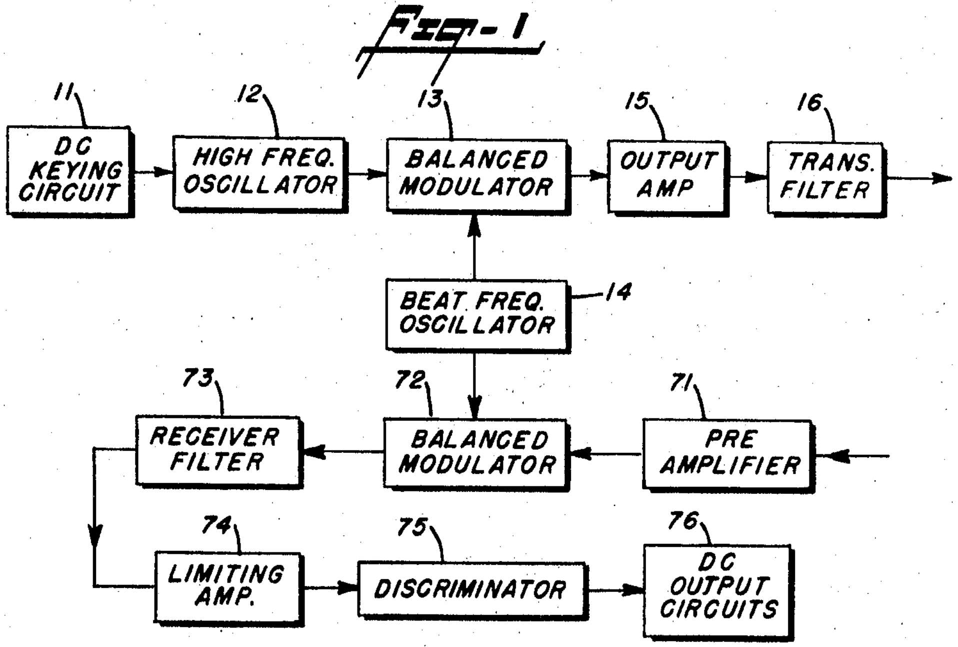
FIGURE 3 is a block diagram of a combined frequency shift transmitter and receiver made in accordance with this invention.

A transmitter-receiver combination particularly adapted for use when the carrier frequency to bit ratio is less than 2.5 is shown in the block diagram of FIGURE 3. Here, the transmitter portion is the same as that shown in FIGURES 1 and 2. However, the receiver section comprises a preamplifier 71 and a balanced modulator 72 inserted ahead of the receiver filter 73. The beat frequency oscillator 14 drives the receiver demodulator 72 to translate the received signals to the higher frequency of the frequency shift modulated transmitter oscillator 12. These translated signals are applied to the receiver filter 73. Whereas the transmitter band-pass filter 16 selects the difference frequency for transmission, the receiver band-pass filter selects the sum frequency. Thus, the receiver filter 73 rejects the 26.6 kilocycle±600 cycle frequencies and passes the 30 kilocycle±600 cycle frequencies to the limiting amplifier 74. The discriminator 75 is designed to distinguish between pulses having frequencies of 30,600 cycles and 29,400 cycles, thereby to effect the operation of suitable D.C. output circuits 76. Since the carrier frequency has been modulated to 30 kilocycles±600 cycles, and the discriminator is also tuned to these frequencies, a filter to remove the carrier from the discriminator output can be designed to have less attenuation to signals at a higher data rate than would be possible with the system shown in FIGURE 1.

Figure 4:
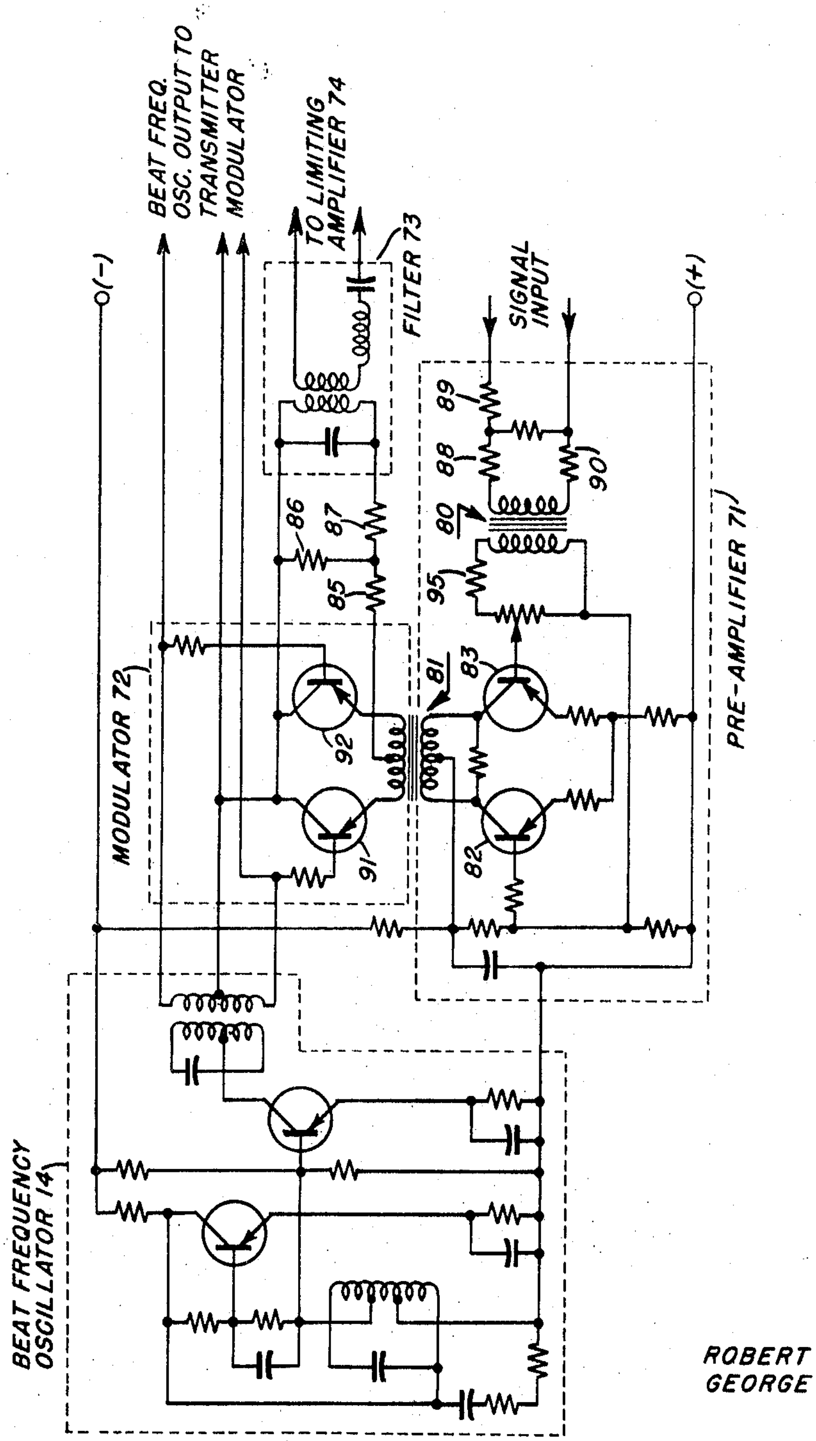
FIGURE 4 is a schematic circuit diagram of the receiver shown in FIGURE 3.

Reference now is made to FIGURE 4, which is a schematic circuit diagram of the receiver preamplifier, modulator and the common beat frequency oscillator, it here being pointed out that the other components form a conventional frequency shift receiver. The preamplifier 71 consists of the input transformer 80, output transformer 81, transistors 82, 83 with associated components, a level control rheostat 84 and impedance improving pads in the form of resistors 85–90. The transistors 82 and 83 are an emitter-coupled pair with the push-pull output transformer in the collector circuit. The secondary winding of this transformer is center-tapped to serve as part of the balanced modulator 72 which includes the switching transistors 91 and 92. The load on the secondary winding is a 3 db pad and the receiver band-pass filter 73. This load is in effect switched across each half of the secondary winding by alternate half cycles of the beat frequency voltage provided by the beat frequency oscillator 12. The amplified carrier signal from the transformer 81 will appear across the load in modulated form as two sideband frequencies; the carrier signal frequency plus the beat frequency, and the beat frequency minus the carrier signal frequency, the beat frequency being suppressed to a low value by the balanced modulator action. The lower sideband is rejected by the filter 73 and the upper sideband is passed to the receiver limiting amplifier 74. The carrier signal to the pre-amplifier 71 is applied through a 3 db pad and the line-isolating transformer 80. The secondary winding of this transformer is terminated with the resistor 95 and the level control rheostat 84 which applies a base-to-base input signal to the transistors 82 and 83, said transistors being biased to CLASS A operation.

It is here pointed out that the modulated transmitter shown in FIGURE 2 provides a channel for the transmission of data at speeds up to 2,000 bits per second over voice band communication links. However, when this transmitter is used with a standard receiver, as shown in FIGURE 1, the system would be adequate for speeds up to 700 bits per second. Such system would have a ±300 cycles per second frequency shift although it could operate at a wider frequency shift. While this particular system can be used at speeds below 170 bits per second, this would not normally be required.

On the other hand, a system comprising the modulated transmitter and modulated receiver, as shown in FIGURE 3, is adequate for speeds up to 2,000 bits per second. Such system has a ±600 cycle per second frequency shift, although it can be operated at other frequency shifts. While this particular system can also be used at speeds below 700 bits per second, it would normally not be required for such applications.

The principal benefit to be derived from the transmitter translation is the ratio of total frequency shift to carrier frequency. The shifting of frequency is normally accomplished in a standard FS transmitter by switching a capacitor in or out across the oscillator tuned circuit. If the shift is small compared to the carrier frequency, then the shift capacitor is small compared to the total circuit capacity and the sudden switching of the capacitor does not appreciably disturb the oscillations. When the shift is great compared to the oscillator frequency, as in the case of higher speed data, this switching disturbs the oscillations adversely. The purpose of the translation is to increase the ratio between the basic oscillator frequency and the frequency shift to avoid this disturbance and yet allow for transmission over telephone and audio circuits. It can be seen that the same results will not be obtained if frequency dividing is used rather than translation. Frequency dividing does not change the critical ratio, since both the carrier and shift frequencies would both be divided equally.

In the receiver, the benefit in translation results from the filter that follows the discriminator. The purpose of this filter is to remove the carrier but its effect upon the data should be minimal. At relatively higher ratios of carrier to bit rate this is easy to obtain in a standard receiver. When ratio becomes too low, it is not possible to obtain a reasonable compromise. The receiver translation effectively increases this ratio again.

Having now described the invention, those skilled in this art will be able to make various changes and modifications without thereby departing from the spirit and scope of the invention as recited in the following claims.

We claim:

1. Apparatus for transmitting high speed binary data over a carrier channel operable over a voice band communication link, said apparatus comprising, (a) a first oscillator tuned to a high frequency and including an inductance coil, (b) a second oscillator tuned to a high frequency different from that of the first oscillator, (c) a balanced modulator circuit comprising a center-tapped coil coupled to the inductance coil of the first oscillator, a pair of switching transistors and means connecting the transistor output circuits alternately across each half of the said center-tapped coil, the input circuits of the transistors being driven by voltages derived from the said second oscillator, thereby producing a difference frequency forming a desired carrier having a frequency in the audio range, (d) means shifting the frequency of the first oscillator in correspondence with the data to be transmitted, the total band width of the shifted frequency being relatively wide with reference to the carrier frequency, (e) an amplifier, (f) circuit elements applying both sidebands of the derived modulated frequencies to the input of the amplifier, and (g) a filter connected in the output circuit of the amplifier, said filter being tuned to pass only the sideband containing the desired carrier frequency.

2. Combined apparatus for transmitting and receiving binary coded data over a frequency shift carrier channel, said apparatus comprising, (a) a first oscillator tuned to a high frequency and having an inductance coil,
(b) a carrier oscillator tuned to a fixed high frequency different from that of the first oscillator,
(c) a first balanced modulator circuit comprising a center-tapped coil coupled to the inductance coil of the first oscillator, a pair of switching transistors, and means connecting the transistor output circuits alternately across each half of the said center-tapped coil, the input circuits of the transistors being driven by voltages derived from the carrier oscillator, said modulator circuit modulating the output of the first oscillator to produce a difference frequency forming a desired carrier channel having an audio frequency,
(d) means shifting the frequency of the first oscillator in correspondence with the data to be transmitted, thereby resulting in signal pulses formed of upper and lower sideband frequencies, the total bandwidth of the sideband frequencies being relatively wide with reference to the carrier channel frequency,
(e) a first amplifier amplifying the said signal pulses,
(f) a first filter connected in the output circuit of said first amplifier and passing only signal pulses formed of the lower sideband frequencies for transmission over the carrier channel,
(g) a second amplifier for amplifying received signals formed of the said lower sideband frequencies, (h) a second balanced modulator circuit comprising a center-tapped coil coupled to the output of the second amplifier, a pair of switching transistors, and means connecting the transistor output circuits alternately across each half of the center-tapped coil, the input circuits of the transistors being driven by voltages derived from said carrier oscillator, thereby to derive a carrier signal having a frequency higher than that of the received carrier,
(i) a second filter passing only the desired sideband of the two sidebands produced by the modulation process of the second modulator,
(j) a limiting amplifier amplifying the signals passed by the said second filter, and
(k) discriminator means to extract the frequency shift signals from the modulated carrier sideband.

References Cited

UNITED STATES PATENTS

| | | | |
|---|---|---|---|
| 2,894,208 | 7/1959 | Crow | 325—163 |
| 3,119,901 | 1/1964 | Bell et al. | 325—320 X |
| 3,205,441 | 7/1965 | Likel | 325—163 |
| 3,334,300 | 8/1967 | Pischke et al. | 325—45 |
| 3,304,500 | 2/1967 | Likel | 325—30 X |

ROBERT L. GRIFFIN, Primary Examiner

WILLIAM S. FROMMER, Assistant Examiner

U.S. Cl. X.R.

178—66; 325—45, 320, 434; 332—43